US011602241B2

(12) United States Patent
Scotti et al.

(10) Patent No.: US 11,602,241 B2
(45) Date of Patent: Mar. 14, 2023

(54) ELECTRONIC CONTROL OF A DUAL-STAGE WATER HEATER IN A HOT-BEVERAGE VENDING MACHINE

(71) Applicant: EVOCA S.P.A., Milan (IT)

(72) Inventors: Mauro Scotti, Milan (IT); Alessandro Magno, Milan (IT)

(73) Assignee: EVOCA S.P.A., Milan (IT)

( * ) Notice: Subject to any disclaimer, the term of this patent is extended or adjusted under 35 U.S.C. 154(b) by 397 days.

(21) Appl. No.: 16/630,618

(22) PCT Filed: Jul. 27, 2018

(86) PCT No.: PCT/IB2018/055642
§ 371 (c)(1),
(2) Date: Jan. 13, 2020

(87) PCT Pub. No.: WO2019/021256
PCT Pub. Date: Jan. 31, 2019

(65) Prior Publication Data
US 2020/0154940 A1 May 21, 2020

(30) Foreign Application Priority Data

Jul. 28, 2017 (IT) ........................ 102017000087300

(51) Int. Cl.
*A47J 31/56* (2006.01)
*F24H 1/20* (2022.01)
(Continued)

(52) U.S. Cl.
CPC .............. *A47J 31/56* (2013.01); *F24H 1/202* (2013.01); *A47J 31/4403* (2013.01);
(Continued)

(58) Field of Classification Search
None
See application file for complete search history.

(56) References Cited

U.S. PATENT DOCUMENTS

2004/0079749 A1   4/2004  Young et al.
2010/0066292 A1*  3/2010  Gottemoller et al. .. H02P 23/14
                                                     318/472

FOREIGN PATENT DOCUMENTS

CH          367610 A      2/1963
CN      103118573 A  *   5/2013   ............ A47J 31/545
(Continued)

OTHER PUBLICATIONS

Engineering Technology Simulation Learning Videos, Functions of a Closed Loop System, Jul. 7, 2015, Retrieved from the Internet : URL: https://www.youtube.com/watch?v=bEnRRI7XXRs (Year: 2015).*

(Continued)

*Primary Examiner* — Brian W Jennison
*Assistant Examiner* — Kevin Guanhua Wen
(74) *Attorney, Agent, or Firm* — Dorsey & Whitney LLP

(57) ABSTRACT

Control of temperature of water delivered by a dual-stage water heater having an external boiler with a first heater as first stage and an internal duct (water booster) with a second heater as second stage. A control loop based on a measured water temperature in the boiler and controls the first heater. A second loop calculate a reference booster water temperature based on the temperature error at the outlet (difference between a measured outlet water temperature and a reference outlet water temperature) and controls second heater based on error between reference booster water temperature and measured booster water temperature. The reference outlet water temperature depends on type of beverage (e.g. espresso, cappuccino) and includes a temperature profile with different temperature for different sub-beverages (e.g. coffee, milk). Takes into account physical response times, inertia of heater and anticipate sudden changes of reference water temperature at hot water outlet.

11 Claims, 11 Drawing Sheets

(51) Int. Cl.
*A47J 31/52* (2006.01)
*A47J 31/44* (2006.01)
*A47J 31/46* (2006.01)
*F24H 9/20* (2022.01)
*G05D 23/19* (2006.01)

(52) U.S. Cl.
CPC .......... *A47J 31/465* (2013.01); *A47J 31/5253* (2018.08); *F24H 9/2021* (2013.01); *G05D 23/1931* (2013.01)

(56) References Cited

FOREIGN PATENT DOCUMENTS

| DE | 3218442 | A1 | | 11/1983 | | |
|---|---|---|---|---|---|---|
| DE | 102014212645 | A1 | * | 12/2015 | .......... | A47J 31/5251 |
| EP | 0577561 | B1 | * | 12/1996 | .............. | A47J 31/56 |
| WO | 0126521 | A1 | | 4/2001 | | |
| WO | 2006050856 | A1 | | 5/2006 | | |
| WO | 2014027310 | A1 | | 2/2014 | | |
| WO | WO 2014027310 | A1 | * | 2/2014 | .............. | F24H 1/20 |
| WO | WO 2015016708 | A1 | * | 2/2015 | .............. | A47J 31/52 |

OTHER PUBLICATIONS

Machine translation of DE 102014212645 A1 performed on Mar. 9, 2022, Antrag (Year: 2015).*
Machine translation of CN 103118573 A performed on Mar. 9, 2022, Rithener et al. (Year: 2013).*
Machine translation of EP 0577561 B1 performed on Mar. 10, 2022, Luessi (Year: 1993).*
International Search Report and Written Opinion from International Application No. PCT/IB2018/055642 dated Nov. 23, 2018.
Matlab, "Understanding Control Systems, Part 3: Components of a Feedback Control System", XP055523703, Retrieved from the Internet: URL:https://www.youtube.com/watch?v=u1pgaJHiiew&index=4&list=PLn8PRpmsu08q8CEOpbZ-cSrMm_WYJfVGd, Nov. 16, 2016 (last accessed Nov. 14, 2018).

* cited by examiner

ELECTRONIC CONTROL OF A DUAL-STAGE WATER HEATER IN A HOT-BEVERAGE VENDING MACHINE

TECHNICAL FIELD OF THE INVENTION

The present invention relates in general to hot beverage vending machines, and in particular to electronic control of a dual-stage water heater for use in hot beverage vending machines, such as coffee-based beverages, e.g. espresso coffee (ES), instant coffee (INST) and/or fresh brew coffee (FB).

STATE OF THE ART

Hot beverage vending machines are known to be equipped with single-stage water heaters, i.e., with a single water tank and a single water heater, usually of the electric resistance type, placed inside the water tank, or with dual-heating stage water heaters, i.e., with two series-connected water tanks arranged one inside the other, and two water heaters associated with the two water tanks.

An example of a dual-stage water heater is described in DE 3218442 or US 2004/0079749. In these examples, the water heater comprises a main water tank provided with a first heater operable to heat up and keep water at a first predetermined stand-by temperature, and a smaller secondary water tank, arranged inside the main tank, thermally insulated therefrom, and provided with a second heater operable to heat up and keep water at a second, predetermined stand-by temperature higher than the first temperature.

Another example of a dual-stage water heater for hot beverage vending machines is described in CH 367610, wherein the second water heater is operated only when steam it to be produced. In this example, a valve is provided which, responsive to pressure increase in the secondary tank, interrupts the fluidic communication between the two water tanks so that only the amount of water contained in the secondary tank is transformed into steam.

In the above examples, the two water heaters are of a storage type, i.e., in which a given amount of water is stored in a water tank and heated up and kept at the desired temperature, and when the water heater is required to dispense a given amount of hot water to prepare a beverage, the withdrawn water is replenished with fresh water and the water in the water tank is then heated up and brought back to the desired temperature.

The Applicant has found that single-stage or dual-stage storage water heaters described in the above documents have numerous drawbacks, the main ones of which are:
i) a stand-by temperature relatively high to such an extent as to exclude, either directly or due to the pressures generated, the use of plastic materials for the construction of the water tank, which is normally made of a metallic material, preferably steel;
(ii) low thermal efficiency, which is the result of high heat loss to the outside due to the relatively high stand-by temperature and the metallic material used for the construction of the water tank;
iii) little flexibility of use, since even by modulating the electrical resistances, it is not possible to vary in a relatively short time the temperature of all the water contained in the water tank; therefore, a vending machine capable of dispensing different hot beverages at different temperatures must normally be equipped with several water heaters, preferably as many heaters as the types of beverages dispensed.

A dual-stage water heater for hot beverage vending machines capable of overcoming the above-mentioned drawbacks is described in WO 2014/027310 A1, in the name of the Applicant, in which the first heating stage is of the water storage type, while the second heating stage is of the continuous flow type, i.e. in which water is heated to the desired temperature while flowing through the second heating stage when a beverage is selected, i.e. only when water is withdrawn to meet the water demand necessary to prepare a beverage.

SUBJECT-MATTER AND SUMMARY OF THE INVENTION

The object of the present invention is to provide an electronic control system for a dual-stage water heater of the type described in WO 2014/027310 A1, and capable of efficiently, accurately and reliably controlling the temperature of the water supplied by the dual-stage water heater.

According to the present invention, an electronic control system for a dual-stage water heater in a hot beverage vending machine, and a dual-stage water heater provided with such an electronic control system are provided, as claimed in the appended claims.

DETAILED DESCRIPTION OF PREFERRED EMBODIMENTS OF THE INVENTION

The present invention will now be described in detail with reference to the attached figures to enable a person skilled in the art to make and use it. Various modifications to the described embodiments will be immediately appreciable to a person skilled in the art and the general principles described may be applied to other embodiments and applications while remaining within the scope of the present invention, as defined by the appended claims. The present invention should not therefore be considered to be limited to the embodiments described and shown, but given a broader scope of protection according to the features described and claimed.

Figure 1:
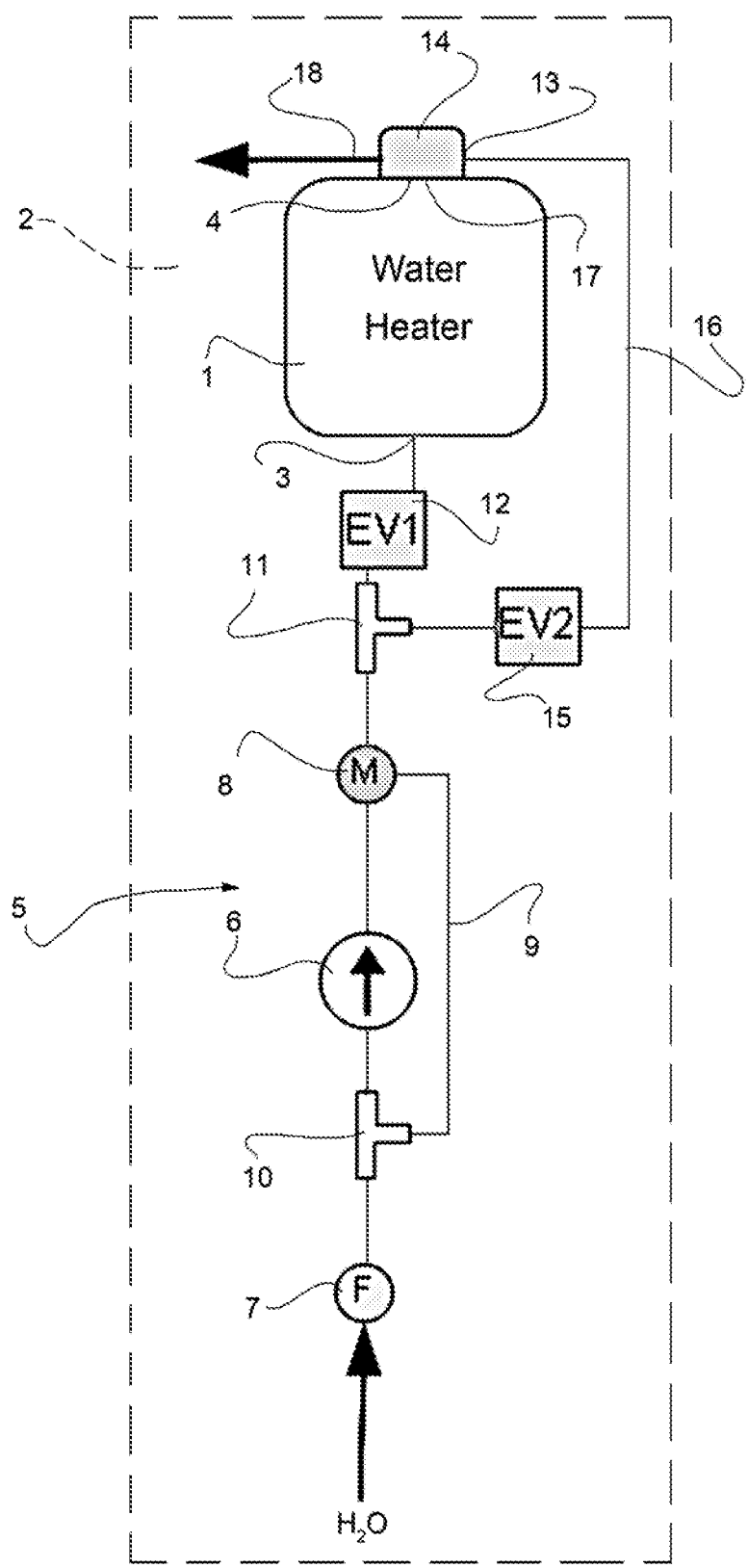
FIG. 1 schematically shows a dual-stage water heater and an associated hydraulic circuit in a hot beverage vending machine.

FIG. 1 schematically shows, and references as a whole with reference numeral 1, a dual-stage water heater for a hot beverage vending machine 2 (also schematically illustrated).

The water heater 1 has a single cold water inlet 3 fluidly connectable to a hydraulic circuit 5 configured to supply cold water (at room temperature) to the cold water inlet 3, and a single hot water outlet 4 fluidly connectable to a beverage production unit (not shown).

The hydraulic circuit 5 comprises a water pump 6 with an intake fluidly connected to a cold water source (not shown) through a suitable water filter 7, and a supply fluidly connected to the cold water inlet 3 of the water heater 1 through a pressure control valve 8 calibrated so as to recirculate towards the intake of the water pump 6, through a bypass branch 9 and a T-connection 10, the water delivered by the water pump 6, when water pressure in the water heater 1 exceeds a maximum pressure.

In one embodiment, the hydraulic circuit 5 is also conveniently configured to carry out two additional functions of mixing hot water dispensed by the water heater 1 with cold water to cause a rapid cooling of hot water dispensed by the water heater 1, and of bypassing the water heater 1. In particular, to accomplish this, the hydraulic circuit 5 is configured to cause cold water supplied to the water heater 1 to be partializable to supply a part to the cold water inlet 3 and a part towards the hot water outlet 4 to mix it with hot water and cause, when needed, as said, a rapid cooling of hot water, as described in more detail below.

To achieve these additional functions, the hydraulic circuit 5 comprises a T-junction 11 having an I/O port fluidly connectable to the pressure control valve 8, an I/O port fluidly connected to the cold water inlet 3 of the water heater 1 through a first solenoid valve EV1 12, and an I/O port fluidly connected to the cold water inlet 13 of the water mixer 14 through a second solenoid valve EV2 15 and a bypass branch 16. The water mixer 14 has also a hot water inlet 17 fluidly connected to the hot water outlet 4 of the water heater 1 and a mixed water outlet 18.

Under normal operating conditions, the first solenoid valve EV1 12 is controlled to be open to cause cold water to be supplied to the cold water inlet 3 of the water heater 1. The second solenoid valve EV2 15 is instead controlled by appropriate PWM modulation to adjust the opening period and, consequently, the cooling of the water supplied by the water heater 1.

In an alternative embodiment, the hydraulic circuit 5 is configured to carry out only the function of supplying cold water to the cold water inlet 3 of the water heater 1, and not also the two additional functions of mixing the hot water dispensed by the water heater 1 with cold water and of bypassimg the water heater 1.

Figure 2:
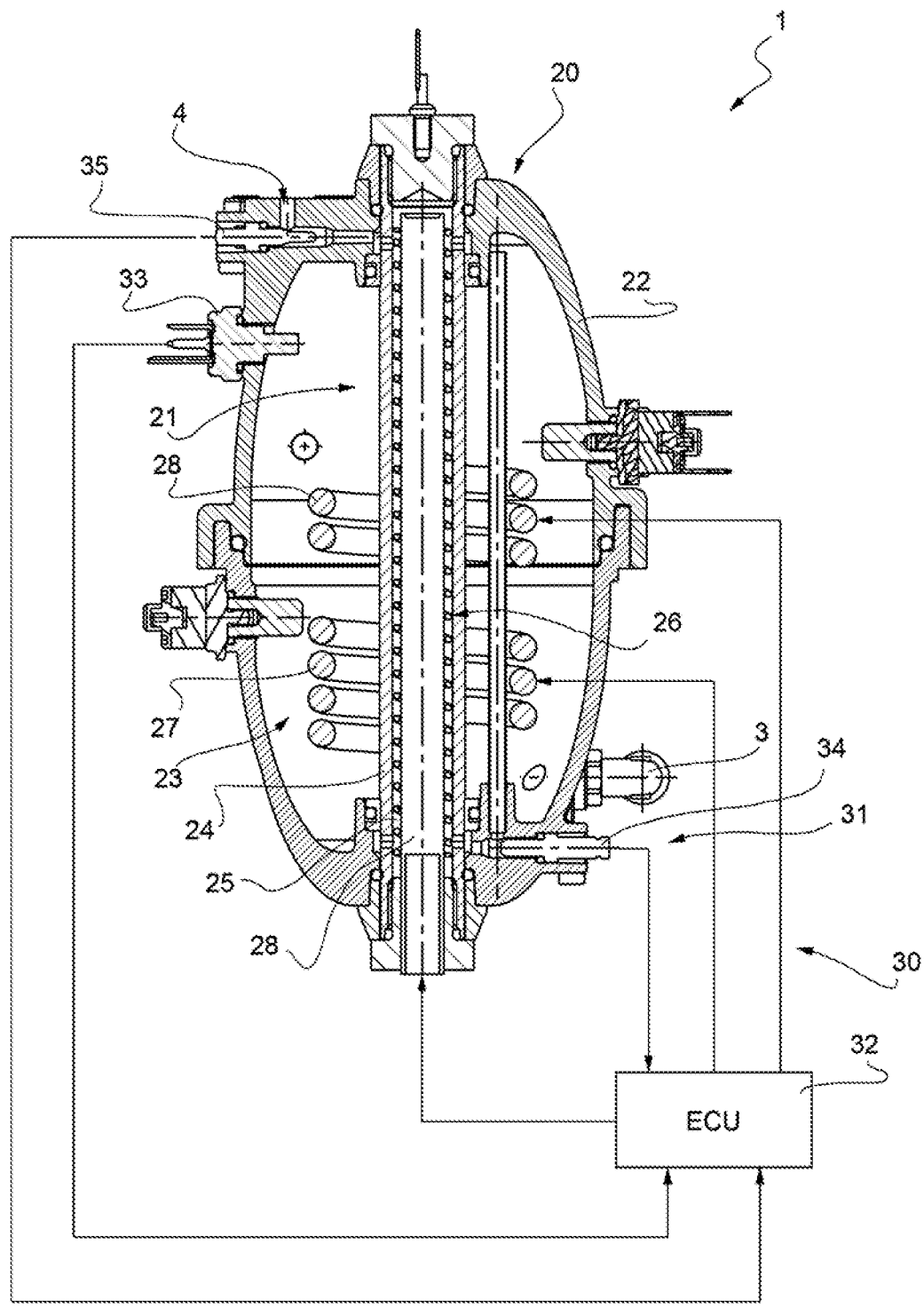
FIG. 2 schematically shows the structure of a dual-stage water heater and a block diagram of an electronic control system of the dual-stage water heater.

In one embodiment, the water heater 1 is conveniently of the type described and shown in WO 2014/027310 A1, in the name of the Applicant, and the content of which is to be considered incorporated herein in its entirety, and is schematically shown in FIG. 2.

In particular, the water heater 1, which will be described below limited only to the features necessary to understand the present invention, comprises:
 a storage water heater stage, for brevity hereinafter referred to as water boiler 20, and
 a continuous-flow water heater stage, for brevity hereinafter referred to as water booster 21, which is housed in, and is fluidly series-connected to, the water boiler 20.

The water boiler 20 comprises:
 an external water tank 22 in which the cold water inlet 3 and the hot water 4 of the water heater 1 are provided, and
 a first electric heater 23 housed in the external water tank 22 and operable to heat up the water contained in the external water tank 22 and keep it at a temperature comprised in a first temperature range, for example between 70 and 80° C., typically 75° C.

In the embodiment shown in FIG. 2, the cold water inlet 3 of the water heater 1 is conveniently provided at the bottom of the external water tank 22, while the hot water outlet 4 of the water heater 1 is conveniently provided at the top of the external water tank 22.

The water booster 21 comprises:
 an internal body 24 housed in the external water tank 22 and defining a water conduit 25 with a water inlet in fluidic communication with the internal volume of the external water tank 22 to receive hot water contained therein, and a water outlet fluidly connected to the hot water outlet 4 of the water heater 1, and
 a second electric heater 26 associated with, and conveniently arranged in, the internal body 24, and operable to heat water flowing in the internal body 24 to a temperature comprised in a second temperature range higher than the first temperature range, for example between 75 and 110° C.

In the example shown in FIG. 2, the external water tank 22 is conveniently in the form of a box-shaped body having a longitudinal axis and formed of two coupled semi-shells, while the internal body 24 is conveniently in the form of a generally cylindrical tubular body arranged in the external water tank 22 coaxially to the longitudinal axis thereof.

In a different embodiment not shown, the external water tank 22 may be in the form of a box-shaped body formed of a cup-shaped body closed by a lid, while the internal body may be again be in the form of a generally cylindrical tubular body, but arranged in the external water tank 22 transversely to the longitudinal axis thereof.

In the embodiment shown in FIG. 2, the first electric heater 23 conveniently comprises first and second electric resistors 27, 28, which have electrical resistances hereinafter referred to as R1 and R2, respectively, are distinct and independently controllable, and are arranged one in the lower part and the other in the upper part of the water boiler 20, and for this reason hereinafter also referred to as lower resistance of the water boiler and higher resistance of the water boiler, while the second electric heater 26 conveniently comprises a third electric resistor 29 with an electric resistance, hereinafter referred to as R3 and also by the term water booster resistance.

In the embodiment shown in FIG. 2, the first and second electrical resistors 27 are helically wound around the internal body 24, while the third electrical resistor 29 is straight-shaped and is coaxially mounted to the longitudinal axis of the internal body 24 and extends substantially along the entire length thereof.

The water heater 1 further comprises an electronic control system 30 comprising:
 a sensory system 31 carried by the external water tank 22 to measure water temperature in certain areas of the water heater 1 and to output electrical signals indicative of the temperatures measured, and
 an electronic control unit 32 electrically connected to the sensory system 31 and to the first and second electric heaters 23, 26, and programmed to receive electrical signals from the sensory system 31 and to control the first and second electric heaters 23, 26 based on the received electrical signals in the manner described below in detail.

In the embodiment shown in FIG. 2, the sensory system 31 comprises:
- a first temperature sensor 33 arranged to measure water temperature, hereinafter referred to as Text_m, in the water boiler 20,
- a second temperature sensor 34 arranged to measure water temperature, hereinafter referred to as Tbooster_m, in the water booster 21, and
- a third temperature sensor 35 arranged at the hot water outlet 4, hereinafter also referred to as delivery point, of the water heater 1 to measure temperature, hereinafter referred to as Tout_m, of the hot water dispensed by the water heater 1.

Conveniently, the first temperature sensor 33 is arranged to measure water temperature at an end of the water boiler 20 opposite the cold water inlet 3 of the water heater 1, in the example shown in FIG. 2 at the top of the water boiler 20, while the second temperature sensor 34 is arranged to measure water temperature at an end of the water booster 21 opposite that of the first temperature sensor 33, in the example shown in FIG. 2 at the bottom of the water booster 22, i.e., at the water inlet of the water booster 21.

In a different embodiment not shown, the sensory system 31 may comprise only the first and third temperature sensors 33 and 35 and not also the second temperature sensor 34, so as to measure only water temperatures in the water boiler 20 and at the hot water outlet 4 of the water heater 1.

In a further embodiment not shown, the sensory system 31 may comprise only the first and second temperature sensors 33 and 34 and not also the third temperature sensor 35, so as to measure only water temperatures in the water boiler 20 and in the water booster 21. In this embodiment, the second temperature sensor 34 may conveniently be arranged at the top of the water booster 21, i.e., at the water outlet of the water booster 21, so as to measure a water temperature very close to, and thus indicative of, the water temperature at the hot water outlet 4.

Figure 3:
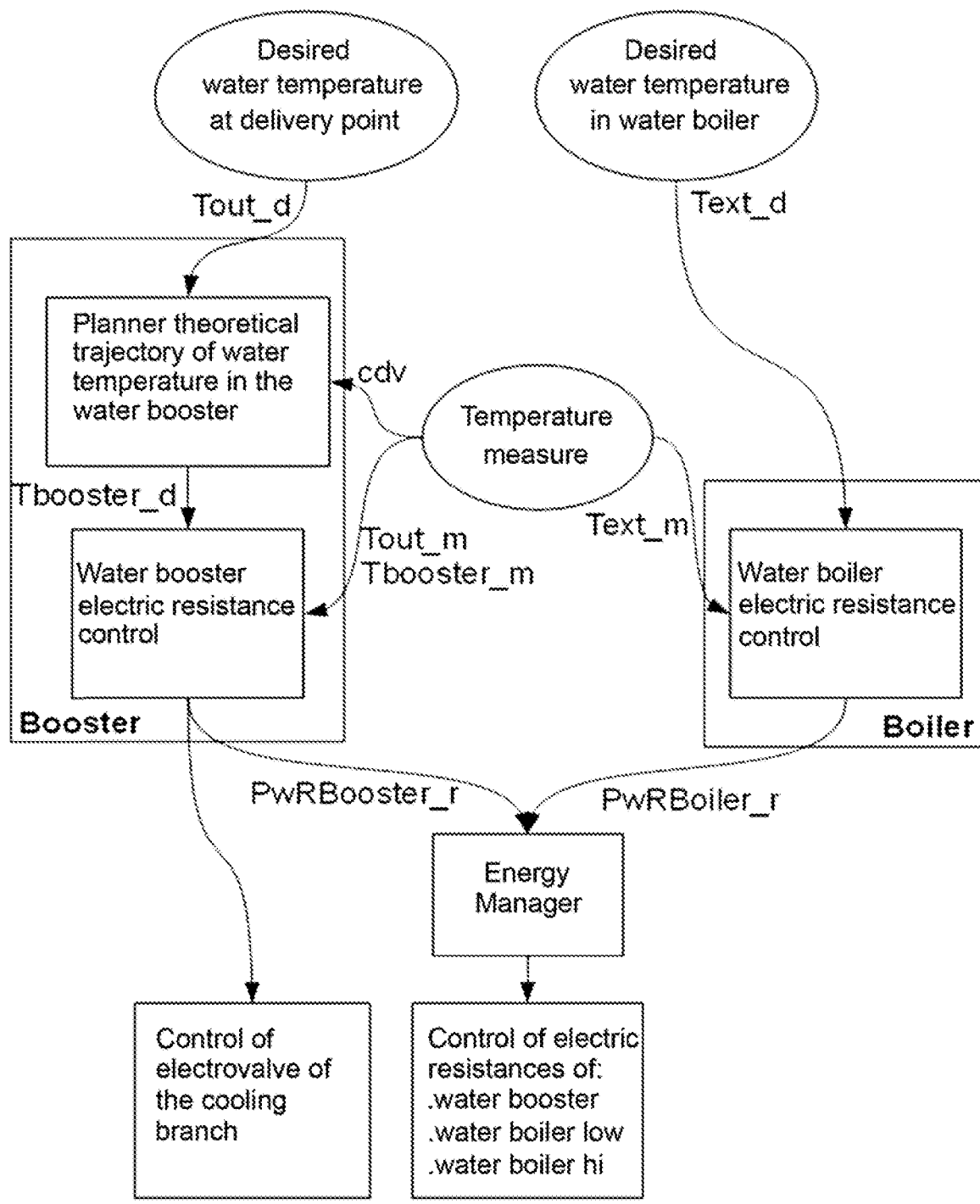
FIG. 3 shows a flowchart of the control of the dual-stage water heater.

In the embodiment shown in FIG. 2, the electronic control unit 32 is programmed to control the first and second electric heaters 27, 28 according to a logic control scheme shown in the self-explanatory flowchart shown in FIG. 3.

The aim of the control is to control water temperature in the water boiler 20 and in the water booster 21 such that they follow as closely as possible the following two reference temperatures:
- Text_d: desired water temperature in the water boiler 20, typically 75° C.;
- Tout_d: desired water temperature at the delivery point 4, which is variable depending on the selected beverage, in the example considered between a minimum of 75° and for example a maximum of 110° C.

The electronic control unit 32 is programmed to achieve this specification by operating based on a mathematical model of the water heater 1 as a whole and of the first and second electric heaters 27, 28, and on measured water temperatures Text_m, Tbooster_m and Tout_m.

The electronic control unit 32 is programmed to compare the measured water temperatures Text_m and Tout_m with the reference water temperatures Text_d and Tout_d, so as to compute error temperatures based on which control signals are generated for the three electrical resistors 27, 28 and 29, and in particular:
- R_Boiler_Low: electric control signal for the lower resistance R1 of the water boiler 20,
- R_Boiler_Hi: electrical control signal for the higher resistance R2 of the water boiler 20,
- R_Booster: electrical control signal for the resistance R3 of the water booster 21, and
- EV_bypass(t): electrical control signal for the solenoid valve EV2 15.

In the embodiment in which the third temperature sensor 35 is not provided to measure water temperature Tout_m at the hot water outlet 4 of the water heater 1, this can be estimated based on the measured water temperature TBoost_m in the water booster 21 measured by the second temperature sensor 34 conveniently arranged at the water outlet of the water booster 21.

However, reference water temperature Tbooster_d is not a desired value stored by an operator in the electronic control unit 32 or by a higher control, but is a value computed by a Planner described below.

Figure 4:
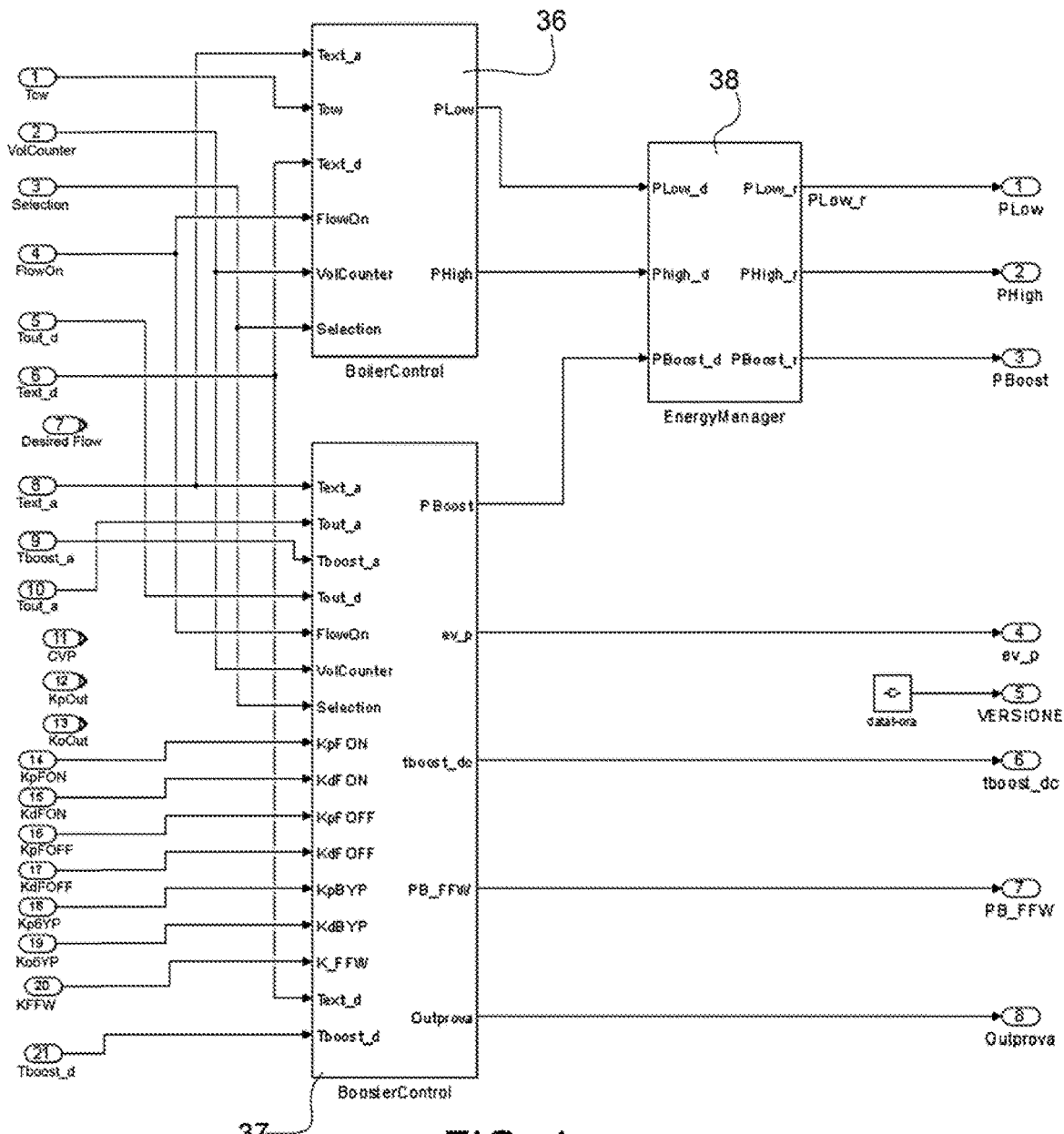
FIG. 4 shows a high-level functional block diagram of the control of the dual-stage water heater.

FIG. 4 shows a functional block diagram of the control carried out by the electronic control unit 32. The control is essentially divided into three macro blocks:
- a water boiler control 36,
- a water booster control 37, and
- an energy manager 38 designed to manage electrical power demands of the water boiler control 36 and water booster control 37.

The meanings of the input and output variables of the blocks shown in FIG. 4 are indicated in Tables 1 and 2, respectively, at the bottom of this description.

1. Water Boiler Control

Figure 5:
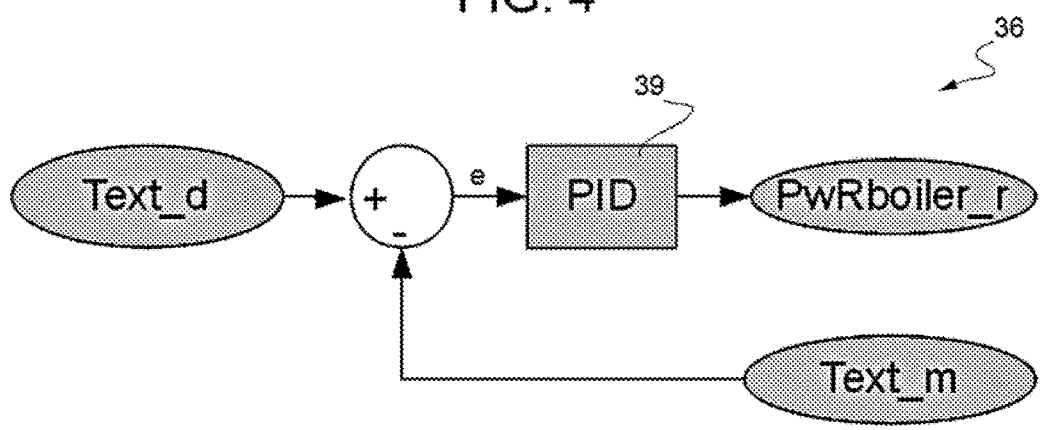
FIG. 5 shows a functional block diagram of the control of a water boiler in the dual-stage water heater.

The water boiler control 36 operates as shown in the functional block diagram shown in FIG. 5. The water boiler control 36 is essentially based on a single PID (Proportional-Integral-Derivative) controller 39 that receives the water temperature error eText=Text_d-Text_m and supply the Energy Manager 38 with a PwRboiler_r electrical power demand for the resistances R1 and R2 of the water boiler 20 and computed according to the proportional, derivative and integral terms.

2. Planner and Water Booster Control

Figure 6:
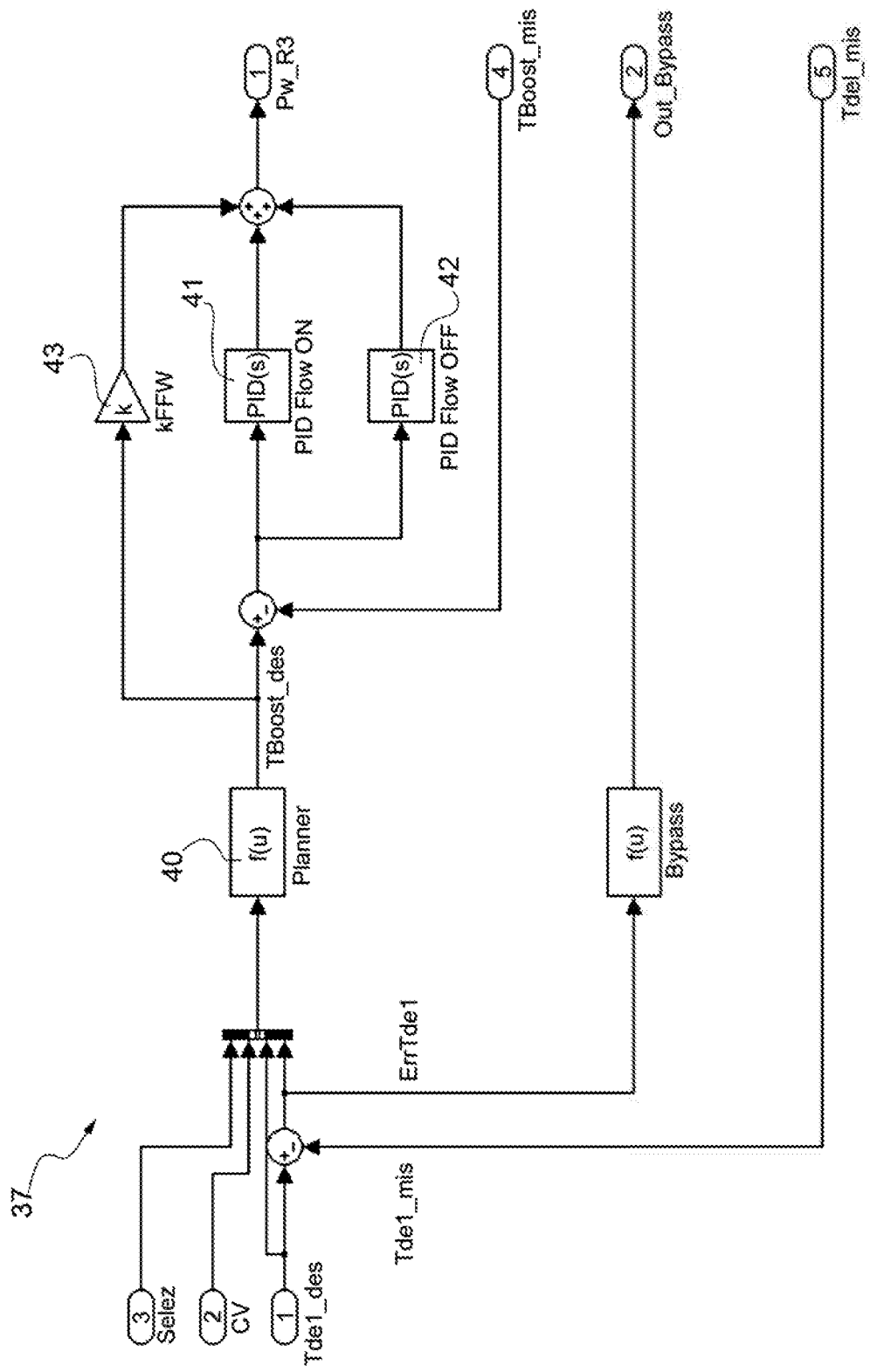
FIG. 6 shows a functional block diagram of the control of a water booster in the dual-stage water heater.

The water booster control 37 operates as shown in the functional block diagram shown in FIG. 6.

The water booster control 37 is more complex than the water boiler control 36 and is based on:
- a planner 40 designed to compute the desired water temperature TBoost_des in the water booster 21 based on water temperature Tdel_des=Tout_d,
- two PIDs, hereinafter referred to as PID Flow ON 41 and PID Flow OFF 42, designed to intervene alternately based on the presence or absence of water flow to compensate for the different behaviour of the system in the two functioning modes (with or without water flow), and
- a feedforward component (kFFW) 43, all of which concur to provide the Energy Manager 38 with an electrical power demand PW-R3 for the resistance of R3 the water booster 21.

Based on the measured water temperature TBoost_m in the water booster 21 and the desired water temperature TBoost_d computed by the planner 40, the water temperature error eTbooster=Tbooster_d-Tbooster_m is then computed to obtain one of the contributions to the electrical power demand PW-R3 for the resistance R3 of the water booster 21, according to the proportional, derivative and integral terms.

In the embodiment in which the second temperature sensor 34 to measure the water temperature TBoost_m in the water booster 21 is not provided, this can be estimated based on the water temperature Tout_m measured at the hot water outlet 4 of the water heater 1.

The other contribution to the electrical power demand PW-R3 for the resistance R3 of the water booster 21 is the feedforward component (KFFW) 43, which acts as a proportional factor on the water temperature step from the water temperature in the water boiler 20 to that in the water booster 21.

Also for the water booster 21, as for the water boiler 20, the electric power PwBooster_r requested to the resistance R3 is managed by the energy manager 38, which, based on all the electrical power demands, determines which are to be energized and which don't.

2.1 Planner

Figure 7:
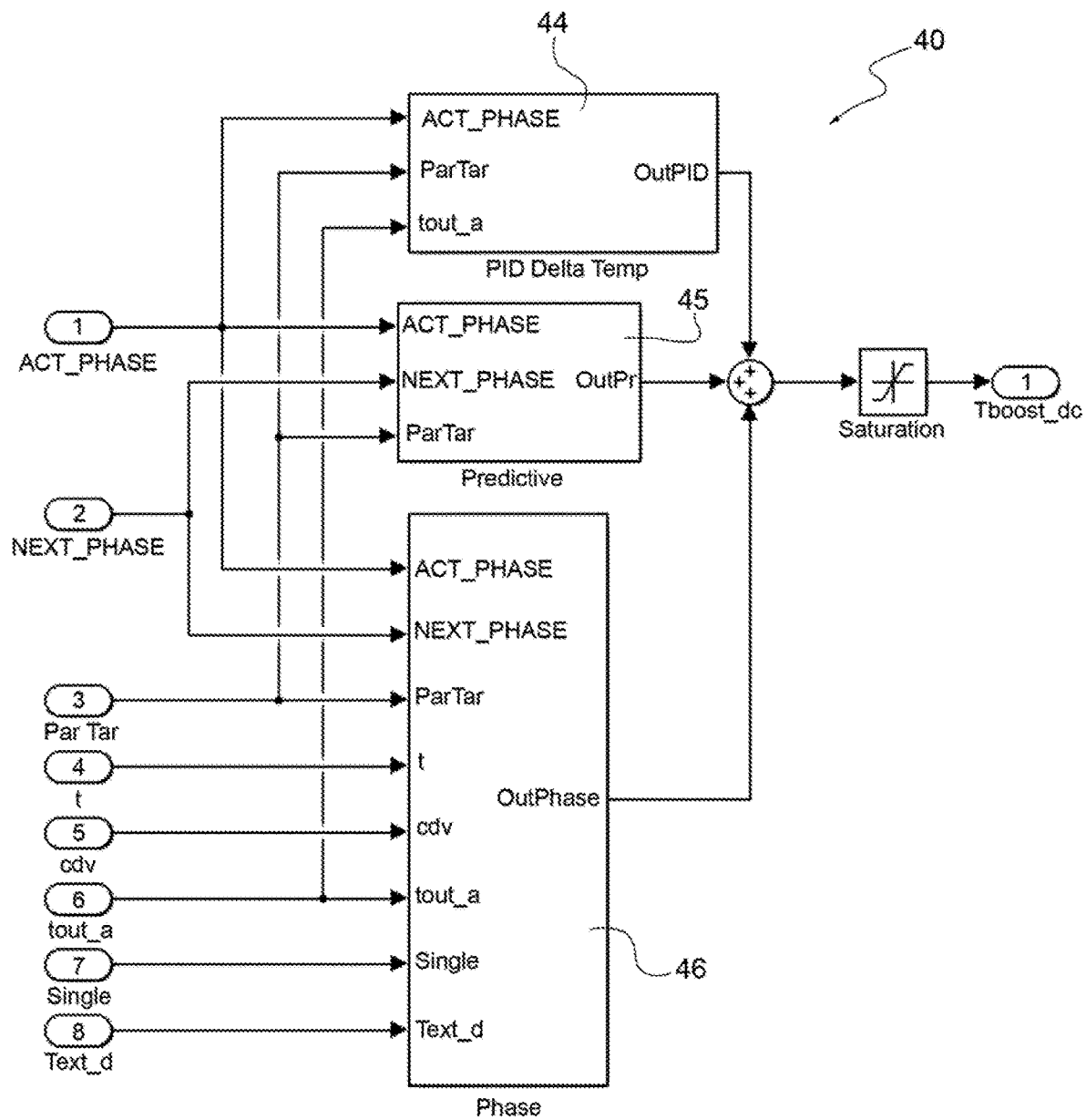
FIG. 7 shows a functional block diagram of a planner implemented to control the water booster.

The planner 40 operates as shown in the functional block diagram shown in FIG. 7, while the meaning of the input variables of the planner 40 and those described in the next Figures are indicated in Tables 3 and 4 at the bottom of this description.

The planner 40 is designed to compute the time development of the desired water temperature TBoost_d in the water booster 21. Based on the physical response times of the system, the inertias of the resistances and the masses involved, the planner 40 is designed to anticipate the actions to be taken on the desired water temperature TBoost_d in order to try to cancel the inherent thermal system delay. In this way, the water heater 1 may manage the sudden changes in the desired water temperature Tout_d at the delivery point 4 based on the principle of preparing the water heater 1 in advance for the subsequent phase.

For example, for the preparation of a mix beverage, such as cappuccino, if the water booster 21 is not preheated during milk dispensing, the coffee will be cold, because the water booster 21 takes a long time to heat the water therein during the flow phase. Similarly, for the preparation of a mocaccino, to switch from coffee to chocolate dispensing, the water heater 1 must be prepared for early cooling before the end of the coffee dispensing.

The planner 40 acts in response to a beverage selection, first on the preparation phase and then on the dispensing phase. In particular, as shown in FIG. 7, the planner 40 can be schematised as the sum of the following three contributions, which are described in greater detail individually below:

PID delta temp 44: the temperature contribution computed in this block represents the temperature delta needed to heat the system downstream of the water boiler 20, predictive 45: the temperature contribution computed in this block represents the time development that the desired water temperature TBoost_d in the water booster 21 must follow, this choice is necessary in the mix beverages to speed up temperature changes between different types of sub-beverages, for example between milk and coffee, or coffee and chocolate, and phase 46: depending on the beverage preparation or dispensing phase, pre-heating and pre-cooling phases are provided to anticipate the inherent thermal system delays.

2.1.1 PID Delta Temp

The PID delta temp block temperature contribution 44 is computed only once at the beginning of the preparation phase of each sub-beverage. So, if a beverage comprises three sub-beverages, this temperature contribution is computed three times. This temperature contribution represents the desired water temperature TBoost_d in the water booster 21 to have the desired temperature Tout_d at the delivery point 4. In particular, this temperature contribution represents the temperature delta needed to heat the system downstream of the water boiler 20, between the water booster 21 and the mixed water outlet 18 of the water mixer 14. This contribution is computed based on the following formula:

$$\text{OutPID} = \text{ACT\_PHASE.Tout}\_d - \text{ParTar}.th\_\text{soglia}\_\text{pid} - \text{Tout}\_a) * Kp\text{Out}$$

wherein:

ACT_PHASE.Tout_d: element of the ACT_PHASE structure that corresponds to the desired temperature at the delivery point of the beverage under preparation or dispensing;

ParTar.th_soglia_pid: element of the ParTar structure: it is a constant that allows the temperature at which a zero contribution is made to be set;

Tout_a: water temperature measured by the water temperature sensor at the delivery point.

KpOut: PID proportional coefficient;

OutPID: temperature contribution from the PID Delta Temp 44.

This temperature contribution is very variable based on the system initial temperature, i.e., on the water temperature measured when the system is cold and is far from the desired water temperature at the delivery point. This temperature contribution is important in order to speed up the heating of the system downstream of the heater, while when the system is already hot, this contribution assumes almost zero, if not negative, values to counteract the inertia to the rise of the water temperature.

2.1.2 Predictive

The predictive temperature contribution 45 represents the desired temperature of a given sub-beverage during delivery thereof. This temperature contribution is necessary in double beverages to take account of the next, beverage and anticipate heating or cooling. This temperature contribution is computed as defined by the following functional code:

If the beverage is single, that is if (Single==true)
    During the final part of the dispensing phase (cdv>ACT_PHASE.cdv*ParTar.p4_cdv_ero) or the dispensing phase has already ended
        OutPr=Text_d; // follows the temperature of the water boiler
    otherwise
        OutPr=ACT_PHASE.Tout_d // follows the temperature of the current beverage If the beverage is a mix beverage
    After the first part of the dispensing phase, if the next temperature is higher, that is when (cdv>ACT_PHASE.cdv*ParTar.p3_cdv_ero && ACT_PHASE.Tout_d<NEXT_PHASE.Tout_d)
        outPr=NEXT_PHASE.Tout_d; // starts heating before the end of the current dispensing
    After the second part of the dispensing phase, if the next, temperature is lower, i.e. when (cdv>ACT_PHASE.cdv*ParTar.p4_cdv_ero && ACT_PHASE.Tout_d>NEXT_PHASE.Tout_d)
        outPr=NEXT_PHASE.Tout_d; // starts cooling before the end of the current dispensing
    otherwise
        outPr=ACT_PHASE.Tout_d; // follows the temperature of the beverage wherein:

ACT_PHASE.Tout_d: element of the ACT_PHASE structure that corresponds to the desired temperature at the delivery point of the beverage during preparation or dispensing;

NEXT_PHASE.Tout_d: element of the NEXT_PHASE structure that corresponds to the desired temperature at the delivery point of the beverage following that is in preparation or dispensing;

ParTar.p3_cdv_ero: element of the ParTar structure representing the percentage thereof used for the computation of a characteristic point, called p3 (represented in FIG. 5 5 and described in detail in paragraph 2.1.3);

ParTar.p4_cdv_ero: element of the ParTar structure representing the percentage thereof used for the computation of a characteristic point, called p4 (represented in and described in detail in paragraph 2.1.3);

cdv: volumetric counter pulses, measurement of the dispensing flow

Single: beverage descriptive characteristic, if single it is TRUE, otherwise FALSE.

Text_d: desired water temperature in the water boiler 20.

OutPr: temperature contribution from the Predictive 45.

2.1.3 Phase

The phase temperature contribution 46 represents the heart of the planner 40, because through the beverage preparation or dispensing it is possible to change the behaviour of the water heater, causing it to follow a non-constant temperature development over time.

The temperature contribution is divided for each sub-beverage into five periods:
- two periods in the preparation phase;
- two periods in the dispensing phase;
- an intermediate period between the preparation and dispensing phases.

For each period the temperature contribution depends on some constants defined during a calibration phase (elements of the ParTar structure in Table 3), these contributions are specific for each sub-beverage.

For each individual delivery of a sub-beverage, the five periods are defined as follows, as also schematically shown in FIG. 13, where the time development of Tboost_d is shown:

Period 1: preparation: from the beverage selection to t1 (theoretical preparation time*% 1)

Period 2: preparation: t1 to t2 (theoretical preparation time*% 2)

Period 3: intermediate: t2 to p3 (theoretical volume (expected cdv)*% 3)

Period 4: dispensing: p3 to p4 (theoretical volume (expected cdv)*% 4)

Period 5: dispensing: from p4 to end of the dispensing phase.

Figure 13:
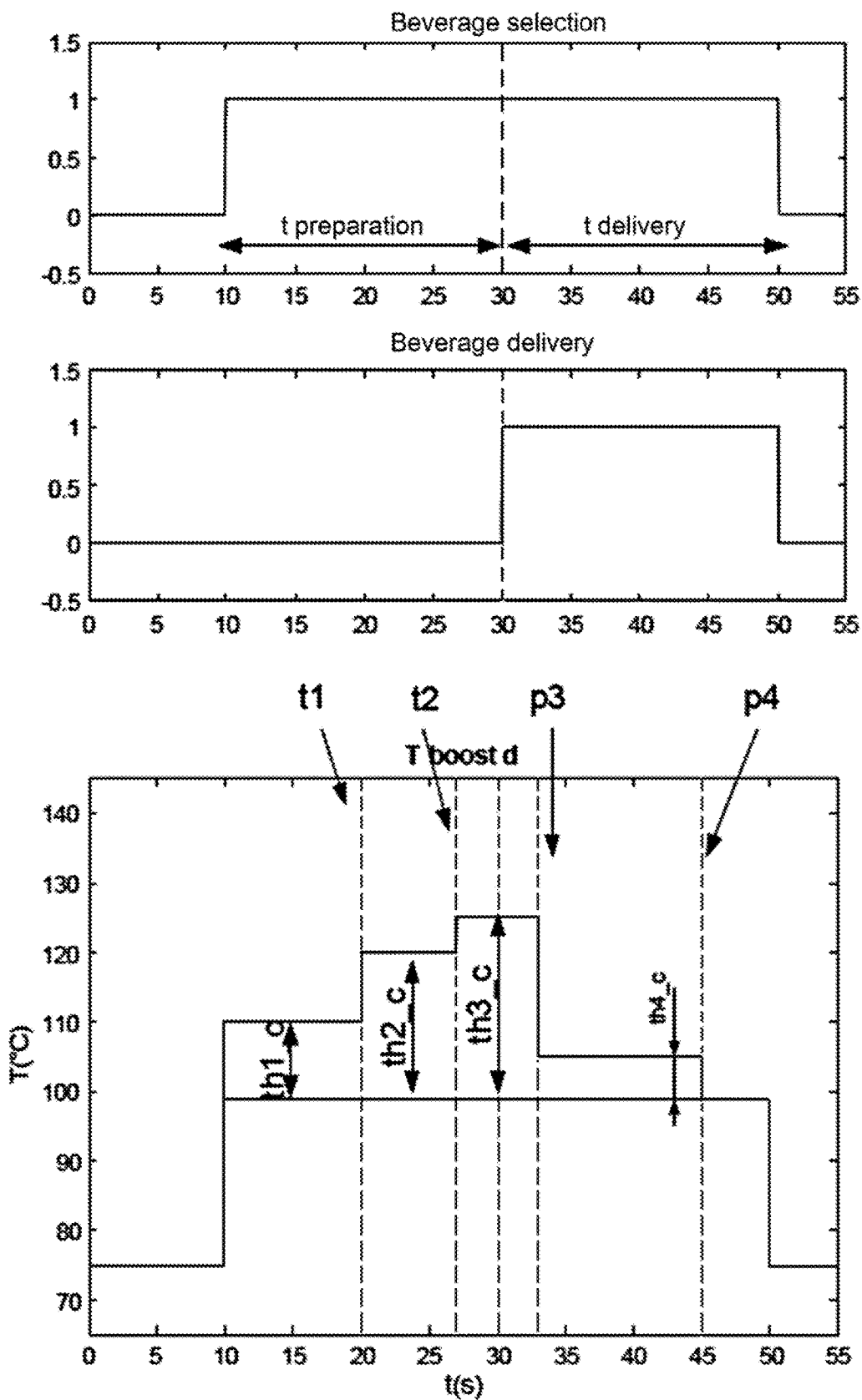
FIG. 13 shows the time development of a desired temperature in the water booster of the duel-stage water heater.

In mix beverages, different deliveries are interspersed with preparation periods, so the diagram shown in FIG. 13 is repeated as many times as there are the types of composition of the beverage. This temperature contribution is computed as defined by the following functional code:

In the first preparation phase, when (t_selection<ACT_PHASE.delay*ParTar.p1_t _pre)
outPhase=ParTar.th1_c In the second preparation phase, when (t_selection<ACT_PHASE.delay*ParTar.p2_t_pre)
outPhase=ParTar.th2_c In the first dispensing phase, when (cdv<ACT_PHASE.cdv*ParTar.p3_cdv_ero) and dispensing is not already completed
outPhase=ParTar.th3_c In the second dispensing phase, when (cdv<ACT_PHASE.cdv*ParTar.p4_cdv_ero)
outPhase=ParTar.th4_c At the end of the dispensing phase
outPhase=0 wherein:

t_selection: measurement of the time between the current time and starting of preparation of the sub-beverage;

cdv: volumetric counter pulses, measurement of the flow in dispensing;

ACT_PHASE.delay_d: Element of the ACT_PHASE structure (reference Table 4) which corresponds to the theoretical preparation time of the sub-beverage;

ACT_PHASE.cdv: Element of the ACT_PHASE structure (reference Table 4) which corresponds to the total value of the volumetric counter pulses set during calibration for that sub-beverage;

ParTar.p1_t_pre: Element of the ParTar structure (reference Table 4) representing the percentage used for the calculation of the first preparation phase, called t1;

ParTar.th1_c: ParTar structure element (reference Table 4) representing a temperature delta;

ParTar.p2_t_pre: Element of the ParTar structure (reference Table 4) representing the percentage used for the calculation of the second preparation phase, called t2;

ParTar.th2_c: ParTar structure element (reference Table 4) representing a temperature delta;

ParTar.p3_cdv_ero: Element of the ParTar structure (reference Table 4) representing the percentage used for the calculation of the first dispensing phase, called p3;

ParTar.th3_c: ParTar structure element (reference Table 4) representing a temperature delta;

ParTar.p4_cdv_ero: Element of the ParTar structure (reference Table 4) representing the percentage used for the calculation of the second dispensing phase, called p4;

ParTar.th4_c: ParTar structure element (reference Table 4) representing a temperature delta;

OutPhase: temperature contribution in output from the "Phase" block.

3. Energy Manager

The energy manager 38 is designed to manage the following three specifications:

1. maximum electrical power: the maximum electrical power that may be supplied by the system is different from, in particular smaller, than the sum of the electrical powers delivered by all the electrical resistances when simultaneously switched on 2. control of flickers: the turning on/off of the electrical resistances must be under control, as indicated in IEC-61000-3-3.

3. the electrical resistances have a fixed electrical power.

Figure 8:
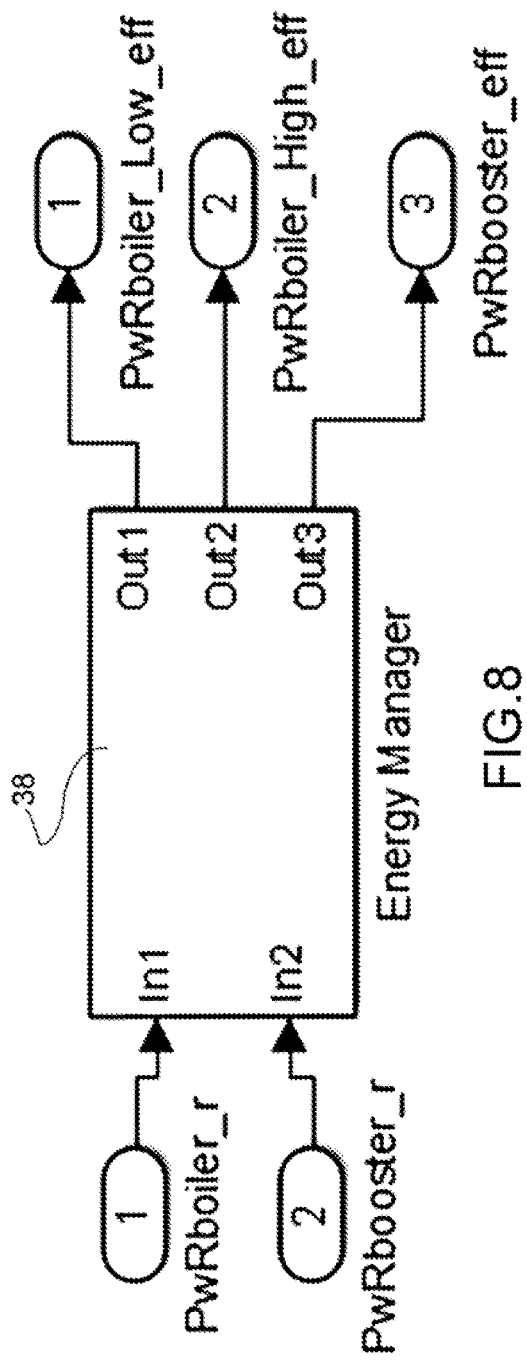
FIGS. 8 to 12 show functional block diagrams of an energy manager implemented to control of the dual-stage water heater.

The energy manager 38, a block diagram of which is shown in FIG. 8, has the purpose of determining whether the electrical power required by the control can be implemented according to specification, or if it needs to be adjusted and alternated between the various electrical resistances.

The resistance R3 of the water booster 21 takes precedence over the two resistances R1 and R2 of the water boiler 20, and when all the three resistances R1, R2 and R3 must be switched on, the two resistances R1 and R2 of the water boiler 20 are switched on alternately.

To control the flickers, the energy manager 38 is designed to cause the electrical power never to change to an extent higher than a certain threshold power.

A non-deliverable energy recovery system is also implemented. For example, if an electrical resistance is capable of delivering an electrical power of 1000 W, if it is required to deliver 400 W three times, the resistance will be switched on at the third request, delivering 1000 W.

Figure 9:
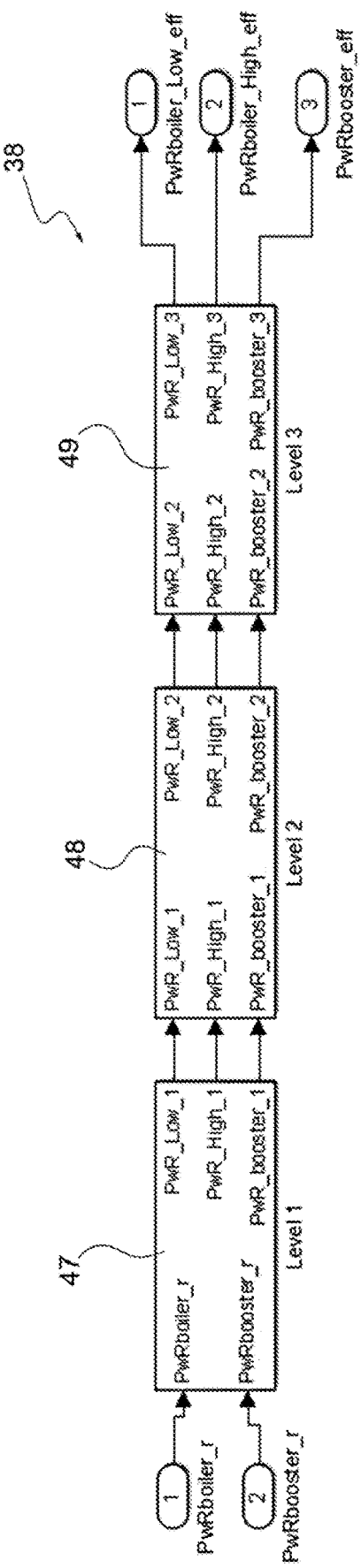

The decisions that is taken by the energy manager 38 may be subdivided, at a conceptual level, into three levels, as shown in the block diagram shown in FIG. 9:

Level 1 47: transition from ideal required electrical power values to real electrical power values deliverable by the electrical resistances (specification 3), Level 2 48: regulation of the turning on and off of the electrical resistances according to the given priorities, since the maximum electrical power that may be supplied fails to correspond to the sum of the electrical powers delivered by the three resistances (specification 1), Level 3 49: control of the timing of turning on and off of the electrical resistances so as to avoid electrical power jumps higher than a certain threshold electrical power (specification 2).

3.1 Level 1

Figure 10:
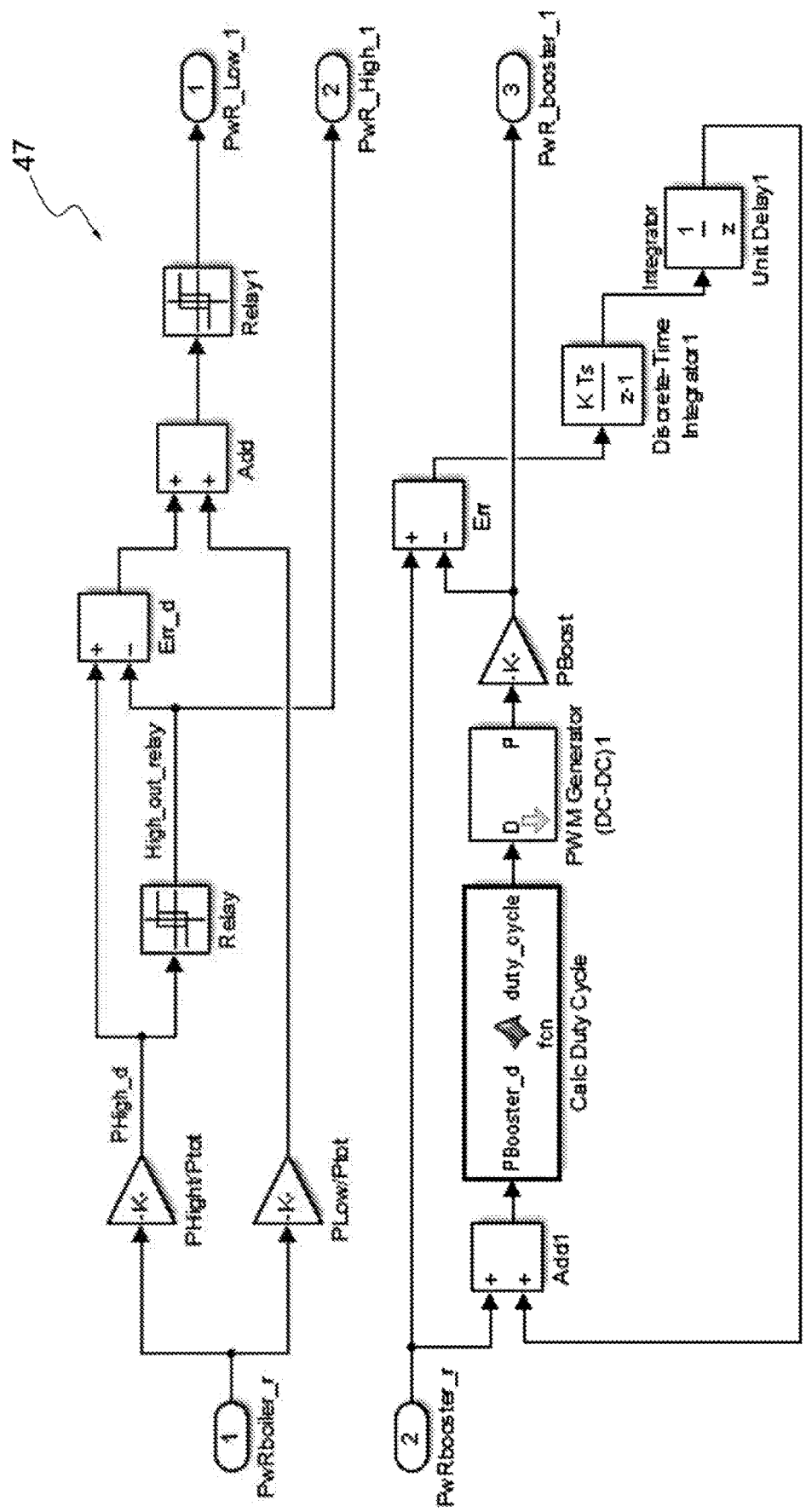

Level 1 47 is used to divide the electrical power demand PwRboiler_r into PwR_Low_1 and PwR_High_1 for the two resistances R1 and R2 of the water boiler 20 according to the diagram shown in FIG. 10. The electrical power demand PwR_High_1 of the higher resistance (PwR_High_1) so computed is filtered through a double threshold function (Relay). The error on the power delivered by the higher resistance is recovered by adding it to the electrical power demand PwR_Low_,1 of the lower resistance, before passing through Relay1.

The control of the resistance R3 of the water booster 21 uses a different method from that of the resistances R1 and R2 of the water boiler 20: the duty cycle of the PWM used to drive the electrical resistance (set at a frequency of 1.5 Hz) is computed based on the electrical power demand. For recovering the non-delivered electrical power, the integral of the error on the electrical power supplied in the previous step is added to the electrical power required at that moment. The duty-cycle values are fixed at three constant values, so as not to increase the risk of flicker, as defined by the following functional code:

If the desired electrical power is less than one-third of the maximum power (PBooster_d<PboilerMax/3):
  duty_cycle=0;
If the desired electrical power is between one-third and two-thirds of the maximum power:
  duty_cycle=0.5;
Otherwise:
  duty_cycle=0;

3.2 Level 2

Figure 11:
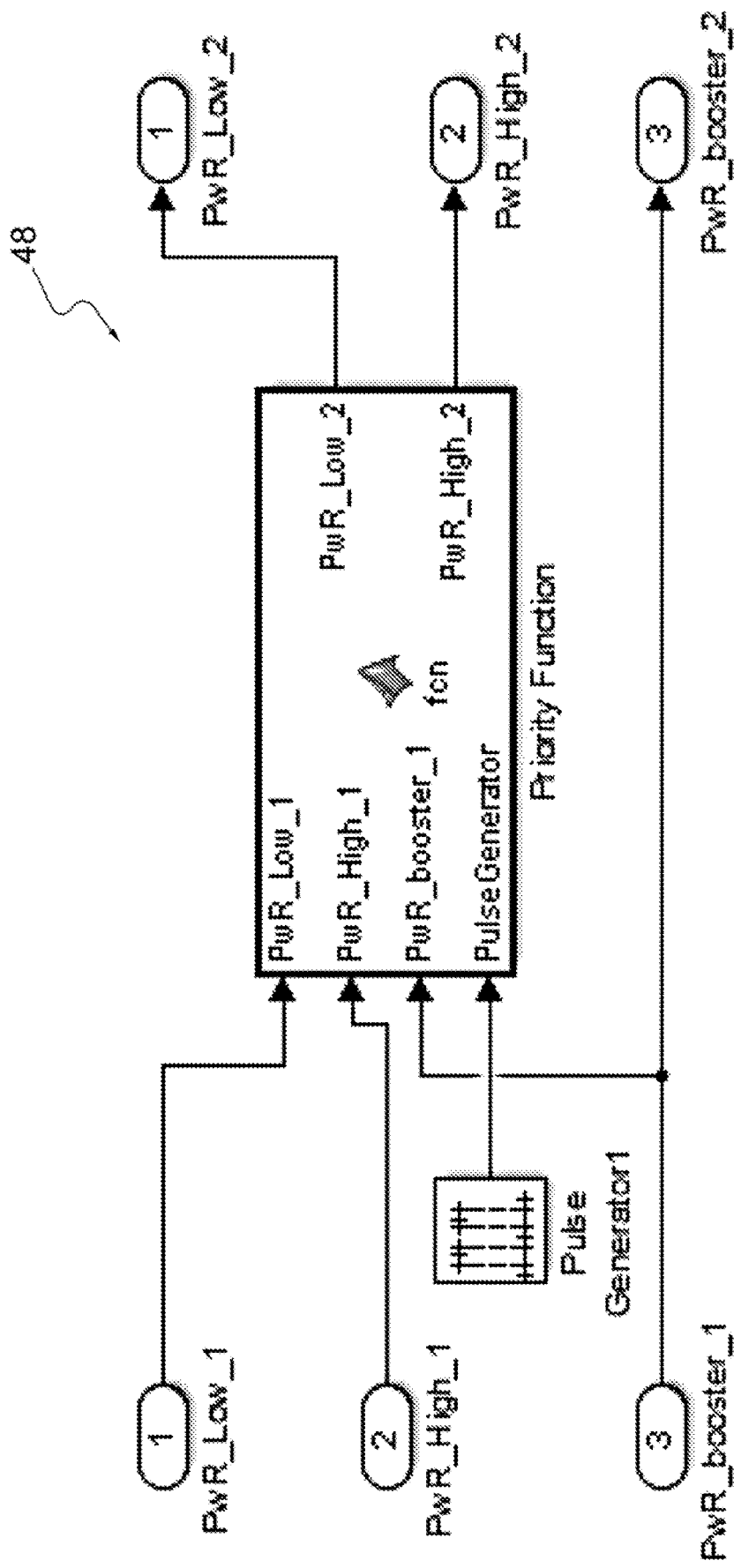

Level 2 48 has the objective of adjusting the deliverable electrical power according to the diagram shown in FIG. 11, since the maximum electrical power fails to correspond to the sum of the electrical powers delivered by the three resistances R1, R2 and R3. In order to decide which resistance has priority for switching on compared to another, the rule described by the following functional code (Priority Function) is used. The highest priority is given to the resistance R3 of the water booster 21, unless the vending machine ignition period in which the resistance R3 of the water booster 21 is not turned on until the water boiler 20 has (almost) reached the desired temperature.

If the sum of the three desired electrical powers is higher than the maximum deliverable electrical power (PwR_Low_1+PwR_High_1+PwR_booster_1)>PboilerMax
  the turning on of the two resistances of the water boiler alternate, following the trend of a square wave generated by "Pulse Generator1" and inputted the block:
    PwR_High_2=PulseGenerator*PwR_High_1;
    PwR_Low_2=(1-PulseGenerator)*PwR_Low_1;
Otherwise, both the electrical powers of the electric resistances of the water boiler can continue to assume the electrical power value computed at "Level I":
    PwR_High_2=PwR_High_1;
    PwR_Low_2=PwR_Low_1;

The square wave generated by the "Pulse Generator1" block has the following characteristics: amplitude 1, Period 4 s, of which 1 s high and 3 s low.

3.3 Level 3

Figure 12:
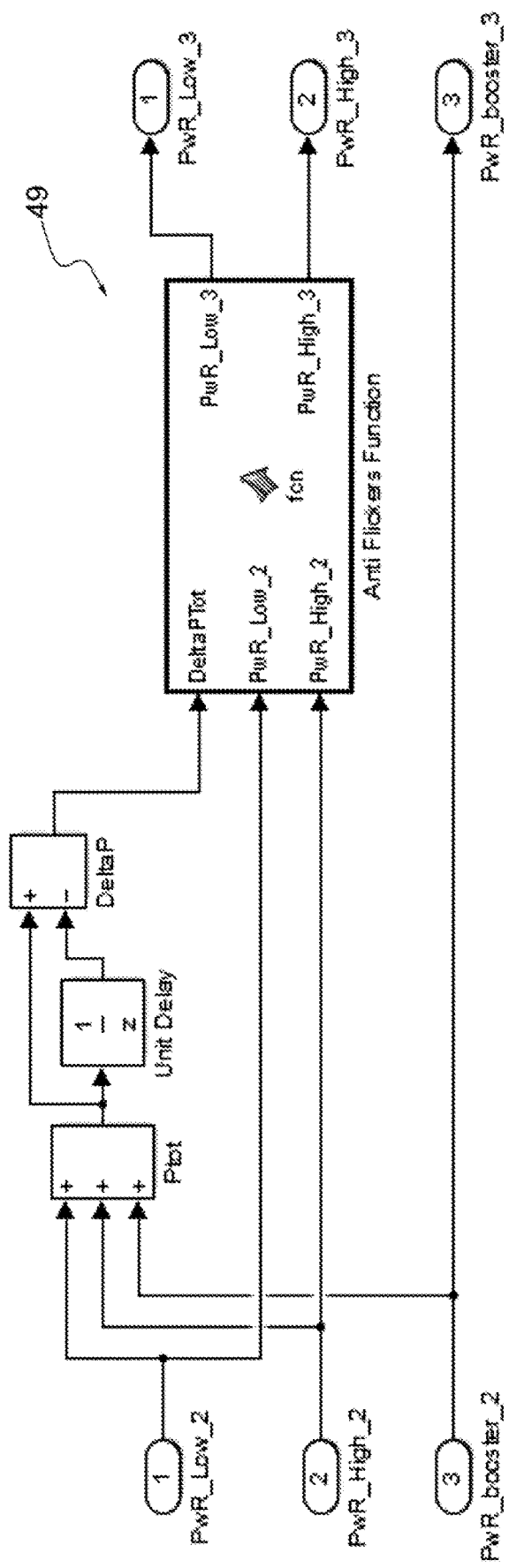

Level 3 49 aims to avoid electrical power jumps higher than a certain threshold electrical power by controlling the "DeltaP" power delta that the system is required to perform according to the diagram shown in FIG. 12 and through the criterion set out in the following functional code (Anti-Flicker Function):

```
DeltaP
function [PwR_Low_3,PwR_High_3] = fcn(DeltaPTot,
PwR_Low_2,PwR_High_2)
PLow = 1000;%Watt
PHigh = 1100;%Watt
PBoost = 1000;%Watt
%if the three resistances are to be switched on together, the
booster has the highest priority
%it is therefore on, while the other two of the boiler alternate
if(abs(DeltaProt)> max(PLow, PHigh, PBoost)) %on or off
of two or more resistances at the same time
if ((PwR_Low_2+ PwR_High_2)==(PLow +PHigh))
%if they are those of the boiler
  PwR_High_3 = 0; % the High falls
  PwR_Low_3 = PwR_Low_2; % the Low rises
else % if the booster also wants to turn on, it has priority
  PwR_High_3 = 0; % both fall
  PwR_Low_3 = 0; % the boiler resistances
end
else %if only one resistance is switched on, the value is not altered
  PwR_High_3 = PwR_High_2;
  PwR_Low_3 = PwR_Low_2;
End.
```

TABLE 1

| Name | Description |
|---|---|
| Tcw | Measured cold water temperature |
| VolConter | Volumetric flow meter |
| Selection | Numerical selection identifier (between one selection and the next: −1). Used only to identify pauses |
| FlowOn | Flow on/off |
| Text_d | Desired |
| Text_a | Measured water temperature in the water boiler |
| Tboost_a | Measured water temperature in the water booster |
| Tout_a | Measured water temperature at the delivery point |
| CVP | Measured volumetric flow meter pulses |
| KpOut | Kp PID Planner |
| KdOut | Kd PID Planner |
| KpFON | Kp PID Flow ON |
| KdFON | Kd PID Flow ON |
| kpFOFF | Kp PID Flow OFF |
| KdFOFF | Kd PID Flow OFF |
| pkFFW | Kp FF |

TABLE 2

| Name | Description |
| --- | --- |
| Plow | Water boiler lower resistance |
| Phigh | Water boiler higher resistance |
| Pboost | Booster resistance |
| ev_p | ByPass |

TABLE 2-continued

| Name | Description |
| --- | --- |
| ver | Version number (corresponding to the date and time of the last change) |
| Tboost_dc | Computed desired water temperature in the water booster |
| Pboost_FFW | Electrical powercontribution of FFW |

TABLE 3

| Structure | Name | Description |
| --- | --- | --- |
| ACT_PHASE | Single | (Boolean) = TRUE if the dispensing in progress or in preparation belongs to a single beverage, i.e. the current delivery is the only delivery of the beverage. |
| | ACT_PHASE.Tout_d | Desired temperature at the "delivery point" of the beverage under preparation or dispensing |
| | ACT_PHASE.cdv | Volumetric flow meter pulses expected during dispensing or preparation |
| | ACT_PHASE.delay | Estimated preparation time before delivery |
| NEXT_PHASE | NEXT_PHASE.Tout_d | Desired temperature at the delivery point of the beverage during delivery after the one in progress or in preparation |
| | NEXT_PHASE.cdv | Volumetric flow meter pulses expected for delivery after the one in progress or in preparation |
| | NEXT_PHASE.delay | Estimated preparation time after that in progress or in preparation |
| ParTar | th_soglia_pid | Offset, affects the computation of the desired water temperature in the water booster |
| | p1_t_pre | Percentage used for computation of t1 |
| | th1_c | Temperature delta used during the period from start of selection to t1 |
| | p2_t_pre | Percentage used for computation of t2 |
| | th2_c | Temperature delta used during the period from t1 to t2. |
| | p3_cdv_ero | Percentage used for computation of p3 |
| | th3_c | Temperature delta used during the period from t2 of the preparation phase to p3 of the delivery phase. |
| | p4_cdv_ero | Percentage used for computation of p4 |
| | th4_c | Temperature delta used during the period from p3 to p4 of the dispensing phase |

TABLE 4

| Name | Description |
| --- | --- |
| Single | (Boolean) = TRUE if the dispensing in progress or in preparation belongs to a single beverage, i.e. the current delivery is the only delivery of the beverage. |
| Toud_d_a | Desired temperature at the "delivery point" of the beverage during beverage dispensing or preparation |
| cdv_p_a | Volumetric flow meter pulses expected during beverage dispensing or preparation |
| delay_a | Estimated preparation time before delivery |
| Toud_d_s | Desired temperature at the "delivery point" of the beverage during the delivery after the one in progress or in preparation |
| cdv_p_s | Volumetric counter pulses expected for delivery after the one in progress or in preparation |
| delay_s | Estimated preparation time after that in progress or in preparation |
| th_soglia_pid | Offset, affects the calculation of the desired water temperature in the water booster. Used to identify the starting point of the system, whether hot or cold. Offset_in = (Tout_d − th_pid − Tout_a)*KpOut |
| p1_t_pre | Percentage used for t1 calculation |
| th1_c | Temperature delta added to Tboost_m and to the Offset_in during the period from start of selection to t1. Tbooster_d = Tboost_m + th1_c + Offset_in; |
| p2_t_pre | Percentage used for t2 calculation |
| th2_c | Temperature delta added to the Tboost_m and to Offset_in during the period from t1 to t2 Tbooster_d = Tboost_m + th2_c + Offset_in; |
| p3_cdv_ero | Percentage used for computation of p3 |
| th3_c | Temperature delta added to Tboost_m and to Offset_in during the period from t2 of the preparation phase to p3 of the delivery phase Tbooster_d = Tboost_m + th3_c + Offset_in |

TABLE 4-continued

| Name | Description |
| --- | --- |
| p4_cdv_ero | Percentage used for computation of p4 |
| th4_c | Temperature delta added to the Tboost_m and to the Offset_in during the period from p3 to p4 of the delivery phase.<br>Tbooster_d = Tboost_m + th4_c + Offset_in |

The invention claimed is:

1. An electronic control system for a dual-stage water heater in a hot-beverage vending machine;
wherein the water heater comprises:
a water boiler; and
a water booster housed in, and fluidically series-connected to, the water boiler;
wherein the water boiler comprises:
an external water tank with a cold water inlet and a hot water outlet; and
a first electric heater housed in the external water tank and activatable to heat the water contained in the external water tank up to, and maintain it at, a temperature comprised in a first temperature range;
wherein the water booster comprises:
an internal body housed in the external water tank and defining a water passage with a water inlet in fluidic communication with the internal volume of the external water tank to receive hot water contained therein, and a water outlet fluidically connected to the hot water outlet of the water heater; and
a second electric heater associated to the internal body and selectively activatable to heat water flowing in the internal body up to a temperature comprised in a second temperature range higher than the first temperature range and depending upon selected beverage;
the electronic control system comprising:
a sensory system to measure water temperatures in the water boiler and in one or both of the water booster and the hot water outlet of the water heater, and to output electrical signals indicative of the measured water temperatures; and
an electronic control unit electrically connected to the sensory system and to the first and second electric heaters and programmed to receive electrical signals from the sensory system and control the first and second electric heaters based on the received electrical signals;
wherein the electronic control unit is programmed to output electrical control signals for the first and second electric heaters based on measured water temperatures and on associated reference water temperatures;
wherein the electronic control unit is further programmed to implement:
a water boiler control designed to output an electric power demand for the first electric heater based on a water temperature error between the measured and reference water temperatures in the water boiler;
a water booster control designed to output an electric power demand for the second electric heater based on a water temperature error between the measured and reference water temperatures either in the water booster or at the hot water outlet of the water heater; and
an energy manager designed to receive the electric power demands for the first and second electric heaters, and to control energization and de-energization thereof based on an energy-management logic;
wherein the reference water temperatures in the water boiler and at the hot water outlet of the water heater are stored in the electronic control unit, at least the reference water temperature at the hot water outlet of the water heater as a function of selected beverage, together with heater parameters comprising physical response times of the water boiler and of the water booster, inertias of the first and second electric heater and masses involved;
wherein the water booster control is further designed to implement:
a planner designed to compute, in response to a beverage selection, the reference water temperature in the water booster based on the measured water temperature either in the water booster or at the hot water outlet of the water heater, the water reference temperature at the hot water outlet of the water heater, the physical response times of the water boiler and of the water booster, and inertia of the first and second electric heaters and the masses involved effective to anticipate possible adjustments of the reference water temperature in the water booster necessary to track sudden changes of the reference water temperature at the hot water outlet of the water heater.

2. The electronic control system of claim 1, wherein the planner is designed to compute three contributions to the reference water temperature in the water booster:
a first contribution indicative of a temperature correction to the reference water temperature in the water booster to cause the measured water temperature at the hot water outlet of the water heater to assume the associated reference water temperature;
a second contribution indicative of the time development of the reference water temperature in the water booster during preparation of a selected beverage comprising different sub-beverages, each of which may require a water temperature different from that of the other sub-beverages; and
a third contribution indicative of the reference water temperature in the water booster during water preheating or pre-cooling sub-steps within the sub-beverage preparation and delivery steps.

3. The electronic control system of claim 2, wherein, for each sub-beverage in a selected beverage, the planner is designed to compute the third contribution for different time periods during the sub-beverage preparation and delivery steps and comprising two time periods during the sub-beverage preparation step, two time periods during the sub-beverage dispensing step, and an intermediate time period between the sub-beverage preparation and delivery steps.

4. The electronic control system of claim 3, wherein, for each sub-beverage in a selected beverage, the third contribution has a stepwise time development comprising three substantially constant stretches with progressively increasing values, followed by two substantially constant steps with progressively decreasing values.

5. The electronic control system of claim 1, wherein the energy manager is designed to control energization and de-energization of the first and second electric heaters to cause absorbed electric power to fail to exceed a maximum absorbable electric power and variation in the absorbed electric power not to exceed a threshold so as to keep under control flicker generation caused by turning-on and turning-off of the first and second electric heaters.

6. The electronic control system of claim 5, for a water heater in which the first electric heater comprises separate and independently controllable first and second electric resistors arranged respectively in the bottom and top parts of the external water tank of the water boiler, and the second electric heater comprises a third electric resistor arranged in the internal body;
wherein the energy manager is designed to implement three decision-making levels:
a first decision-making level, where electric power demands are converted into corresponding real electric powers to be dissipated by the first, second, and third electric resistors;
a second decision-making level, where the first, second, and third electric resistors are energized and de-energized based on pre-set priorities so that electric power absorbed by the first, second, and third electric resistors fail to exceed the maximum absorbable electric power; and
a third decision-making level, where energization and de-energization times of the first, second, and third electric resistors are controlled so as to prevent variations in the absorbed electric power higher than a threshold electric power.

7. The electronic control system of claim 6, wherein the energy manager is further designed to:
determine whether the electric power absorbed by the first, second and third electric resistors that it is necessary to energize simultaneously to bring the measured water temperatures in the water boiler and in the water booster to assume the reference water temperatures is higher than the maximum absorbable electric power;
in the affirmative case, determine the maximum number of electric resistors that can be energized simultaneously; and
if the maximum number of electric resistors that can be energized simultaneously is lower than the number of electric resistors that it is necessary to energize simultaneously to bring the measured water temperatures in the water boiler and in the water booster to assume the reference water temperatures, determine an alternating turning-on sequence for the first, second, and third electric resistors that are to be energized so as to fail to exceed the maximum absorbable electric power, giving higher priority to the third electric resistor of the water booster over the two electric resistors of the water boiler.

8. The electronic control system of claim 6, wherein the energy manager is further designed to implement an electric power recovery strategy to recover electric power that cannot be supplied by an electric resistor capable of supplying a certain electric power, such that, in the presence of a series of demands for electric power lower than the one that can be supplied by the electric resistor, the electric resistor is energized when the sum of the demands for electric power is equal to or higher that the electric power that can be supplied by the electric resistor.

9. A software loadable in an electronic control unit of an electronic control system for a dual-stage water heater in a hot-beverage vending machine, and designed to cause, when executed, the electronic control unit to become programmed as claimed in claim 1.

10. A dual-stage water heater for a hot-beverage vending machine, the dual-stage water heater comprising:
a water boiler; and
a water booster housed in, and fluidically series-connected to, the water boiler;
wherein the water boiler comprises:
an external water tank with a cold water inlet and a hot water outlet; and
a first electric heater housed in the external water tank and activatable to heat the water contained in the external water tank up to, and maintain it at, a temperature comprised in a first temperature range;
wherein the water booster comprises:
an internal body housed in the external water tank and defining a water passage with a water inlet in fluidic communication with the internal volume of the external water tank to receive hot water contained therein, and a water outlet fluidically connected to the hot water outlet of the water heater; and
a second electric heater associated to the internal body and selectively activatable to heat water flowing in the internal body up to a temperature comprised in a second temperature range higher than the first temperature range and depending upon selected beverage,
wherein the water heater further comprises an electronic control system of claim 1.

11. The water heater of claim 10, further comprising a water mixer having a hot water inlet fluidically connected to the hot water outlet of the water heater to receive hot water therefrom; a cold water inlet selectively fluidically connectable to the cold water inlet of the water heater through a bypass circuit to receive part of the cold water supplied to the water heater, and a water outlet to supply mixed water;
wherein the bypass circuit comprises a T-junction having an I/O port fluidically connectable to a cold-water source, an I/O port fluidically connected to the cold water inlet of the water heater through a first solenoid valve, and an I/O port fluidically connected to the cold water inlet of the water mixer through a second solenoid valve and a bypass branch.

* * * * *